United States Patent [19]

Senda et al.

[11] Patent Number: 5,093,772
[45] Date of Patent: Mar. 3, 1992

[54] METHOD OF SEQUENCE CONTROL

[75] Inventors: Toshiji Senda; Mikio Ono; Kazuo Omodaka; Katsuhiko Yamase; Hideyuki Shiizaki; Tsuneo Fukuda, all of Wakayama, Japan

[73] Assignee: Kao Corporation, Tokyo, Japan

[21] Appl. No.: 461,073

[22] Filed: Jan. 4, 1990

[30] Foreign Application Priority Data

Aug. 9, 1989 [JP] Japan .................. 64-205899
Nov. 28, 1989 [JP] Japan .................. 64-308245

[51] Int. Cl.⁵ .............................. G05B 11/01
[52] U.S. Cl. ............................ 364/140; 364/141
[58] Field of Search .......... 364/140, 141, 147, 191, 364/192, 200, 900, 468

[56] References Cited

U.S. PATENT DOCUMENTS

| | | | |
|---|---|---|---|
| 4,298,958 | 11/1981 | Takaki et al. | 364/900 |
| 4,608,628 | 8/1986 | Saito et al. | 364/141 |
| 4,633,385 | 12/1986 | Murata et al. | 364/191 |
| 4,683,549 | 7/1987 | Takaki | 364/900 |
| 4,747,048 | 5/1988 | Mueller | 364/184 |
| 4,908,745 | 3/1990 | Ichiyasu et al. | 364/140 |
| 4,947,315 | 7/1990 | Sokolow et al. | 364/200 |

OTHER PUBLICATIONS

"Steuerung von variablen Chargenproduktionen mit Standardsoftware: Das Softwarepaket„ Grundoperationen", H. J. Frisch et al., ATP/Automatisierungstechnische Praxis 30 (1988) No. 4, Munchen, W. Germany, pp. 186–190.

"Modulare Standarsoftware fur die Automatisierung von funktionellen Verfahrensbereichen mit dem Prozessleitsystem Teleperm M", K. H. Horst, Koln et al., ATP Automatisierungstechnische Praxis 31 (1989), Juni, No. 6, Munchen, DE, pp. 282–286.

*Primary Examiner*—Jerry Smith
*Assistant Examiner*—Paul Gordon
*Attorney, Agent, or Firm*—Wenderoth, Lind & Ponack

[57] ABSTRACT

In a method of sequence control for controlling a production installation containing one or more functional units independent of brand and process of product to be produced, unit sequence programs are provided for each of the functional units. A series of steps from start process to a stop process are installed for every minimum function unit which are independent of brand and process of a product to be produced. Sequence control is performed by enabling and disabling the selected unit sequences automatically or manually, so that the functional unit is controlled by the parameter stored in the unit sequence program.

18 Claims, 18 Drawing Sheets

Fig. 5

| stage NO. | 1 | 2 | 3 | 4 | 5 | 6 |
|---|---|---|---|---|---|---|
| operation NO. | 3 | 2 | 4 | 5 | 8 | 1 |
| unit A | | | | | | |
| unit B | | | | | | |
| unit C | | | | | | |
| unit D | | | | | | |
| unit E | | | | | | |
| unit F | | | | | | |
| unit G | | | | | | |
| unit H | | | | | | |

Fig. 6

| process | 1 | 2 | 3 | 4 |
|---|---|---|---|---|
| operation NO. | 2 | 4 | 1 | 3 |
| stage NO. | 1 | 2 | 3 | 4 |
| ① A material supply unit | | | | |
| ② B material supply unit | | | | |
| ③ heating unit | | | | |
| ④ circulation unit | | | | |
| ⑤ mixing unit | | | | |
| ⑥ vacuum unit | | | | |
| ⑦ timer unit | | | | |

Fig. 9 operation name master

| operation NO. | operation name |
|---|---|
| 1 | transfer |
| 2 | heat |
| 3 | supply |
| 4 | vacuum reaction |
|  |  |

Fig. 16
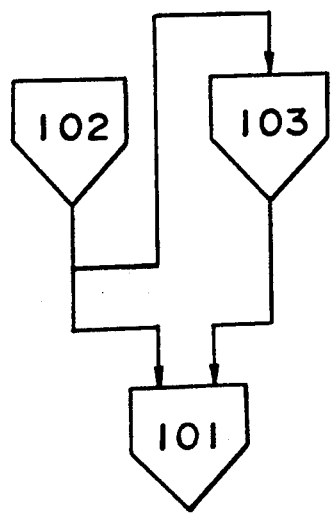
Fig. 17
1. A          103   101
2. B    102   103   101
3. C    102         101
Fig. 18
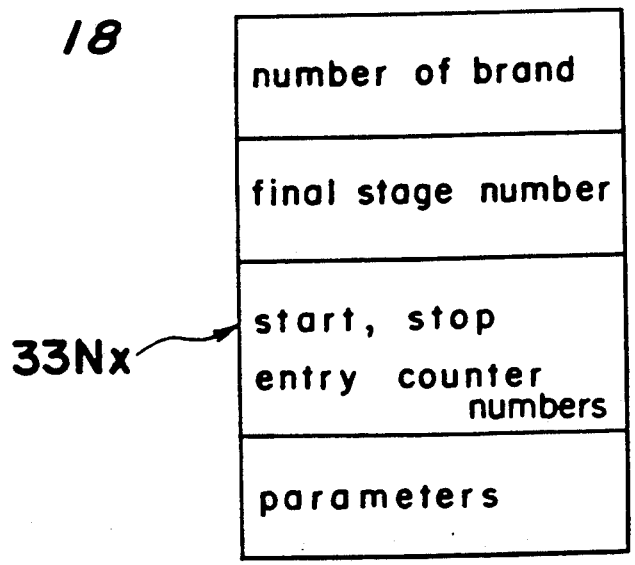

METHOD OF SEQUENCE CONTROL

BACKGROUND OF THE INVENTION

1. Field of the Invention

The present invention relates to a method of sequence control, and more particularly to a method of sequentially controlling a production system having various control equipment, such as a material supply unit, heating unit and so on, under predetermined control conditions.

2. Description of the Prior Art

A sequence control is used for controlling various operation equipment provided in a production plant to enable and disable the respective equipment in a predetermined sequence.

There has been proposed a sequence control method in Japanese Patent Publication KOKAI NO. 59-125403.

The method is directed to a sequence control method for use in a batch production process. In this method, there are provided two kinds of sequence control programs consisting of one or more so called equipment sequences for controlling each equipment provided in the production system and one or more so called process sequences which are combination of a plurality of equipment sequences. A plurality of the process sequences are assembled in a series of sequence control programs in a time divisional manner, in other words, serially by a batch sequence for performing a production system. In this method, each of the equipment is initialized at the time just when the respective process starts. The batch sequence puts provisional control numerical values in the sequence control program and practical numerical value are placed in the sequence control program when the program is actually started.

In the conventional sequence control method, it is necessary to design the sequence control programs for all of the production processes of all of the products to be produced. Also, it is difficult to design the sequence control program without specific experience about the design technique of the sequence control and the installation of the production plants.

SUMMARY OF THE INVENTION

An essential object of the present invention is to provide a method of sequence control which is easy to design without requiring a specific experience for the designer.

Another object of the present invention is to provide a method of sequence control which is easy to understand and operate.

In order to accomplish the above objects, according to the present invention, the installations or equipment provided in production plants are considered as an assembly of units separated by functions such as material supply unit, heating unit, mixing unit and so on. In the control method, there are provided unit sequence programs for the respective units; each program has a similar logic configuration including a start processing step, a interruption processing step and a stop processing step. In the start processing step, various instrument parameters, such as the amount of material supplied the process temperature to which the material is heated, and the process pressure to which the material is presurized, are loaded from a brand controlling computer to a control computer depending on the contents of the brand of the products to be produced. The unit sequence programs are enabled or disabled according to an operation scheduler which is a set of instructions for starting and stopping defined corresponding to the contents of the operation of the plant.

BRIEF EXPLANATION OF THE DRAWINGS

FIG. 5 is a schematic diagram showing an example of an operation scheduler;

FIG. 6 is a schematic diagram showing another example of an operation scheduler;

FIG. 9 is a schematic diagram showing memory map of an example of operation name master;

FIG. 16 is a schematic diagram showing a further example of a connecting relationship of the tanks;

FIG. 17 is a schematic diagram showing an example of a control process in which production process using three tanks are controlled by one control computer;

FIG. 18 is a memory map for storing showing various data for performing the process shown in FIG. 17;

DETAILED DESCRIPTION OF THE PREFERRED EMBODIMENTS

Hereinafter, an embodiment of a sequence control method according to the present invention will be described more in detail, taken in conjunction with the accompanying drawings.

Figure 2:
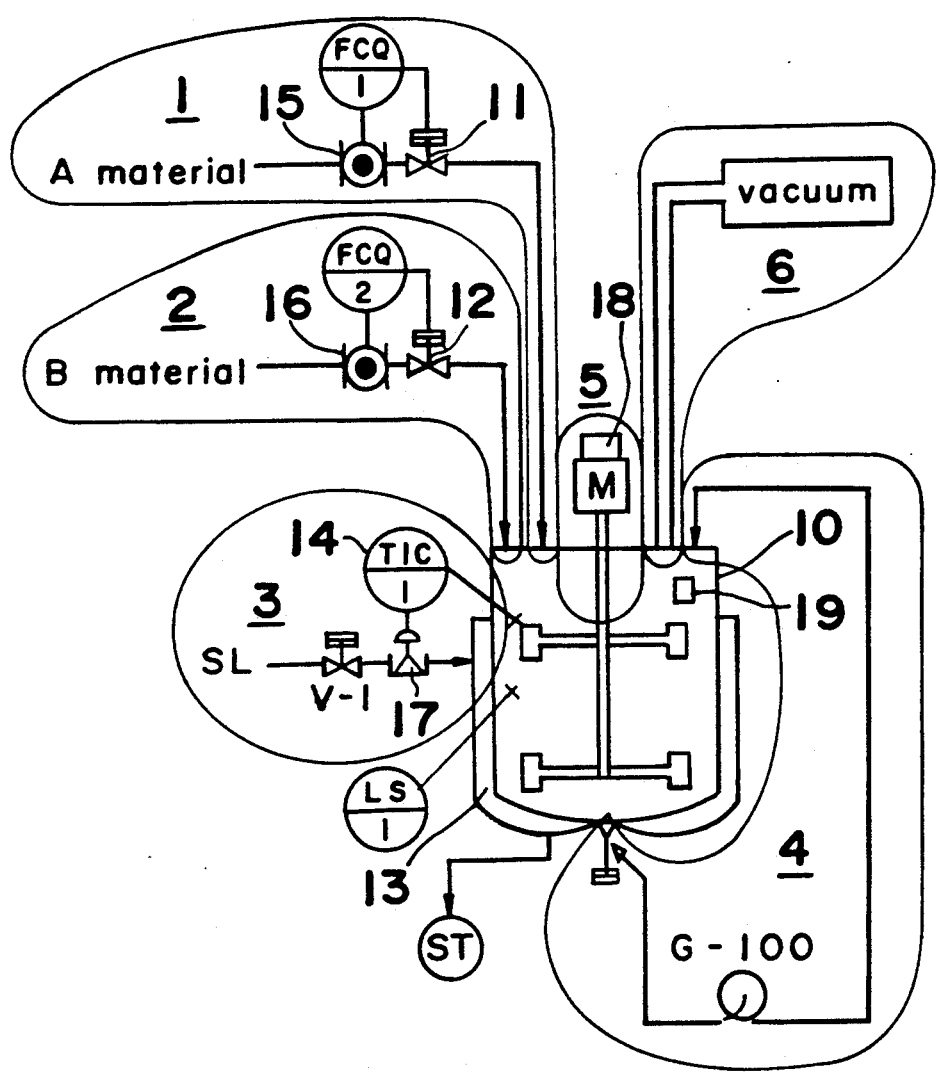
FIG. 2 is a schematic diagram showing an example of a production system used to which the control method of the present invention is applied.

FIG. 2 is a diagram showing an example of a production system comprising a processing tank 10 and various functional units, in which numeral 1 denotes a supply unit for supplying material A to the tank 10; numeral 2 denotes a B material supply unit; a numeral 3 denotes a heating unit for heating the content of the tank 10; numeral 4 denotes a circulating unit; a numeral 5 is a mixing unit; and a numeral 6 denotes a vacuum unit for vacuuming the tank 10.

The supply units 1 and 2 are connected to valves 11 and 12 respectively, and by opening the valve 11 or 12, A material or B material can be fed into in the tank 10.

The heating unit 3 is in the form of a heating jacket 13 surrounding the tank 10 and the temperature of the content in the tank 10 can be controlled by controlling the amount of steam supplied to the heating jacket 13 by opening or closing a control valve 17.

The supply amount of the A material can be detected by a flow integrator 15, and the supply amount of the B material can be detected by a flow integrator 16, and the temperature of the tank 10 can be detected by a temperature sensor 14.

The rotating speed of the mixing unit 5 can be detected by a revolution counter 18.

The degree of vacuum of the vacuum unit 6 can be detected by a vacuum sensor 19.

Figure 1A:
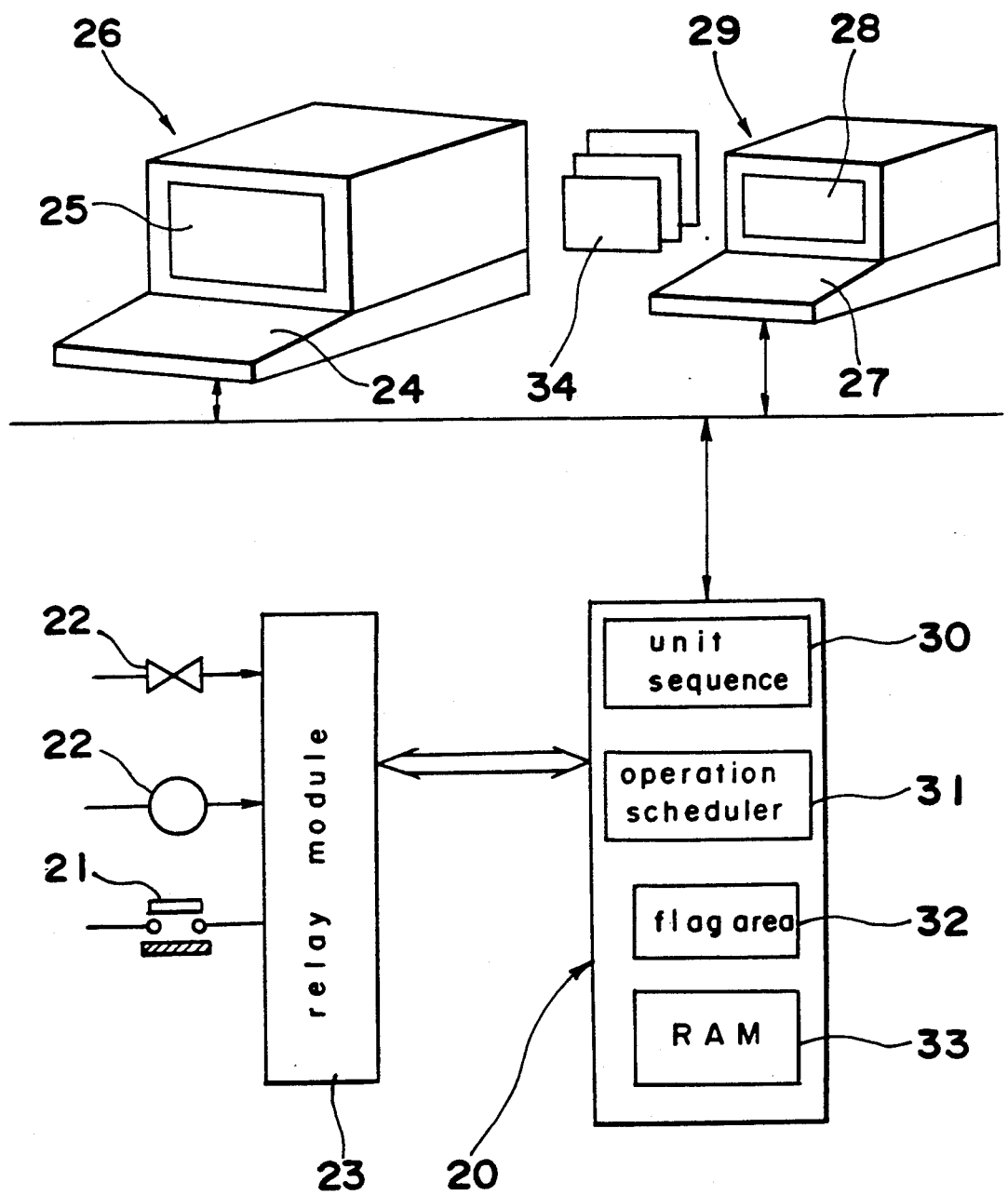
FIG. 1(A) is a block diagram of an example of a control device used in a control method according to the present invention.

The respective data obtained by the, sensors mentioned above are inputted to a controlling unit shown in FIG. 1(A).

Referring to FIG. 1(A), the sequence controlling unit of the present invention comprises a control computer 20, an operator's console 26 and a brand controlling computer 29. (An operator's console 26 and a brand controlling computer 29 can be called a central control device individually or collectively in this invention.) The control computer 20 consists essentially of a microcomputer, general-purpose computer or other data processing unit, and connects a relay module 23 serving as an input and output interface for sending and receiving signals between actuators 22, such as valves, pumps, heaters or motors, and the control computer 20, and the relay module 23 connects sensors 21 including the temperature sensor 14, flow sensors 15 and 16, revolution counter 18, vacuum sensor 19, a limit switch, and level sensor or the like provided in the respective units 1 to 6 to the control computer 20. The operator's console 26 has a keyboard 24 through which the operator inputs data and a cathode ray tube or CRT 25 for displaying the input and output data. The brand controlling computer 29 has a keyboard 27 for inputting various parameters associated with the brands of products to be manufactured, and a CRT 28 for displaying the parameters, etc.

The control computer 20 has a memory area for storing a set of unit sequence programs 30 for controlling the sequential operations of the respective units 1 to 6 and an operation scheduler 31 for enabling and disabling the necessary unit sequence programs and a flag area 32 for storing flags as controlling signals generated during the operation of the relevant unit sequence program or programs.

The term 'unit' in the wording of 'unit sequence program' means any one of the A material supply unit 1, B material supply unit 2, heating unit 3, circulating unit 4, mixing unit 5, vacuum unit 6, or the like.

It is an essential feature of the present invention that any production plant can be considered as an assembly of several minimum functional operation units such as the supply unit, heating unit, mixing unit and so on and in the present invention, and in each minimum functional operation unit, there is provided a series of control sequence steps for starting the unit, stopping the unit and so on. A series of the computer program for performing the control sequence steps is so called the unit sequence program in the present invention. The unit sequence is determined based on the installations provided in the production plant, but not on the brand of products to be manufactured.

Figure 3:
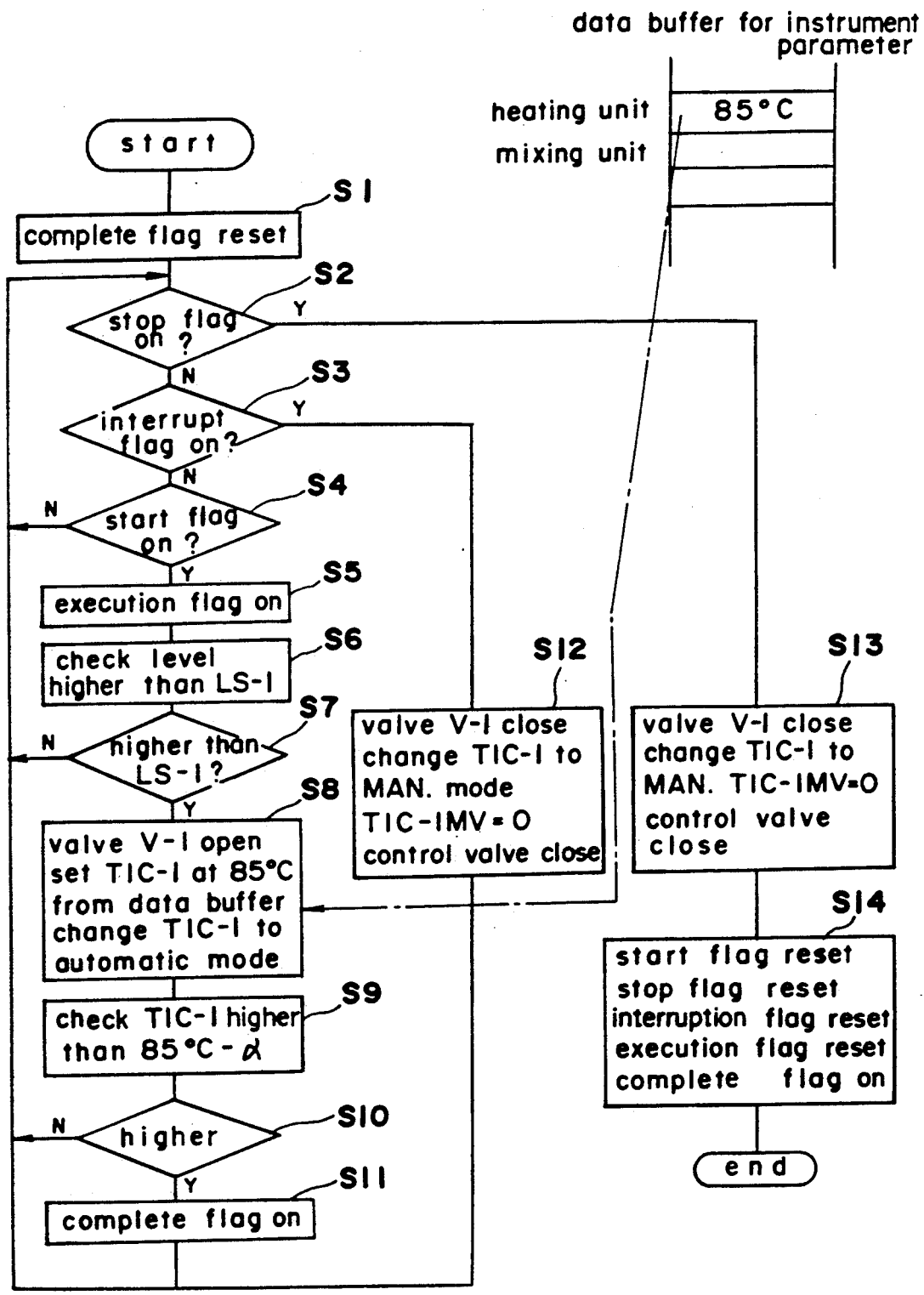
FIG. 3 is a flowchart showing an example of a unit sequence program of a heating unit.

FIG. 3 shows an example of a unit sequence program of the heating unit.

In the unit sequence program, there are assigned a start flag, stop flag, interrupt flag, execution flag, complete flag, and the unit sequence program has the following functions: when the start flag is turned ON, the unit sequence is changed to a start process (in this connection, the allocation of flag has some differences between automatic operation and manual operation); when the stop flag is turned ON, the unit sequence is changed to a stop process; when the interrupt flag is turned ON, the unit sequence is changed to an interruption process; when the execution flag is ON, the unit sequence executes; and also when the complete flag is turned ON, when the unit sequence satisfies the complete conditions.

Particularly, the start flag, stop flag, and complete flag have close relationships with the operation scheduler, and the start flag and the stop flag are used for starting and stopping the unit sequence respectively, and the complete flag is used as a condition for advancing from one process to another process (referred to as a stepping condition hereinafter).

A detailed explanation of the flowchart shown in FIG. 3 will be made. At step S1, the complete flag is reset; at step S2, the stop flag is checked, in which if the stop flag is turned ON, the program skips to step S13, while if it is turned OFF, the program goes to step S3 to check the interrupt flag. If the interrupt flag is turned OFF, the program goes to step S4 to check the start flag. If the start flag is turned ON, the program goes to step S5 to turn the execution flag ON in this unit sequence, and checks at step S6 whether the liquid level exceeds 'LS-1' or not. Then, the program goes to step S7, and determines whether or not the liquid level exceeds 'LS-1'. If the liquid level is below the 'LS-1', the program returns to step S2, while if it is above the same, the program goes to step S8, and valve V-1 is opened, furthermore the temperature set value of the sensor TIC-1 is set to 85° C. of the AUTO mode fetched from the data buffer. Then, the program goes to step S9, and checks whether or not the process value or PV of the sensor TIC-1 is above '85° C.-α', and determines whether or not the PV is above '85° C.-α' at step S10. If it is above '85° C.-α', the program goes to step S11 to turn the complete flag ON, and then returns to step S2. If it is below '85° C.-α', the program returns to steps S2 as well.

At step S12, the AUTO mode is switched to the MAN mode where the valve V-1 is closed, the manipulation value or MV of the sensor TIC-1 is set to '0', and the control valve is completely closed.

At step S13, the valve V-1 is closed, the mode of the sensor TIC-1 is switched to the MAN mode where the MV of the sensor TIC-1 is set to '0', and the control valve is completely closed. At step S14, the start flag is reset, the stop flag is reset, the interrupt flag is reset, the execution flag is reset, and the complete flag is turned ON, thereby completing the series of sequence.

Figure 4:
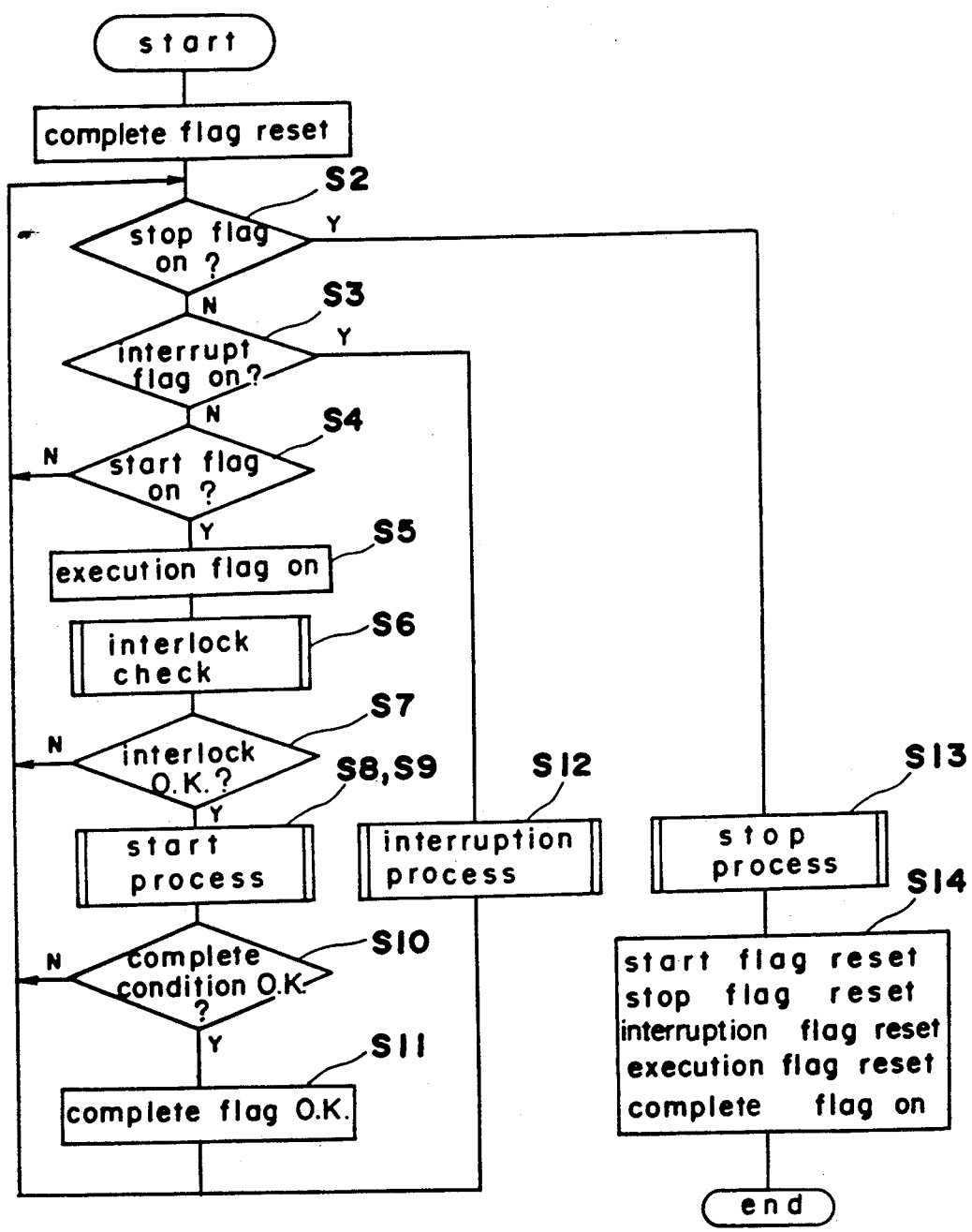
FIG. 4 is a flowchart showing an example of a unit sequence program according to the present invention.

According to the present invention, the unit sequence program programmed as mentioned above are provided for the respective units in the control computer 20. FIG. 4 is a flowchart which represents a general form of the unit sequence program being available commonly for all the units.

As apparent from the comparison between FIGS. 3 and 4, every step is commonly applied to every unit, and the contents of steps S6, S7, S8, S9, S10, S12, and S13 can be optionally rewritten by parameters through the brand controlling computer 29 or other suitable external input unit.

In addition, the respective flags of steps S2, S3, and S4 in the unit sequence program are signals obtained from the operation scheduler and/or other program such as operations of push button switches, sensors, limit switches, cooperating with the relevant unit sequence program. These signals are written to the flag area 32 from other programs as mentioned above, and this flag area 32 is read by the unit sequence.

Next, a description is provided for each parameter.

In the unit sequence program, all of the control condition depending on the brand of products to be manufactured are expressed as parameters. When the unit sequence program is started by the operation scheduler or manual operation, the unit sequence program is executed with reference to the instrument parameters. The following table is an example of the instrument parameters.

TABLE 1

| instrument parameters | |
|---|---|
| supply unit; | supply tank, supply amount, supply speed |
| heating unit; | temperature rising curve, heating temperature |
| cooling unit; | cooling temperature |
| transporting unit; | destination tank, transporting amount. |

Figure 1B:
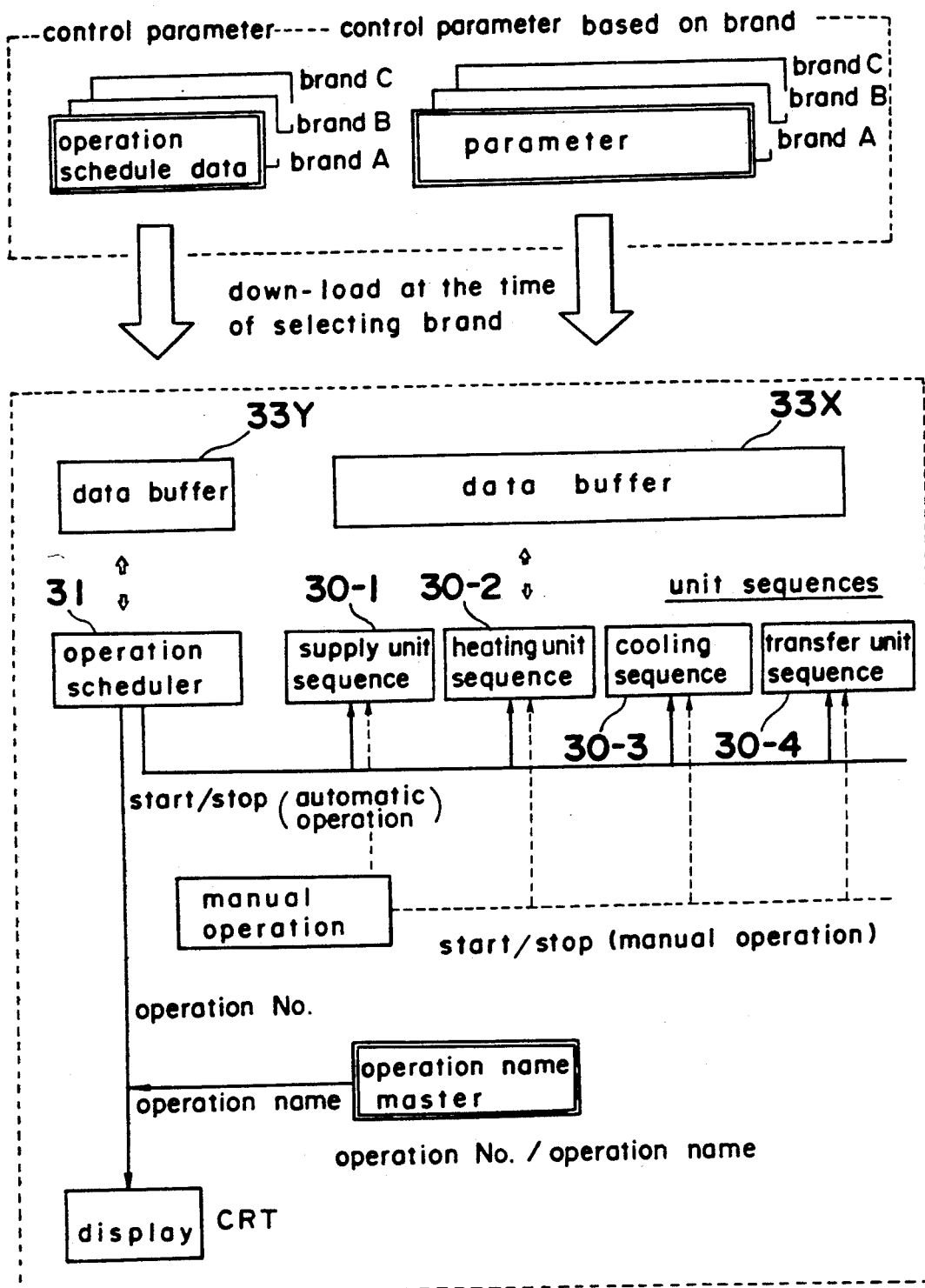
FIG. 1(B) is a block diagram showing an essential portion of the control device shown in FIG. 1(A)

The instrument parameters of each brand of products to be manufactured are inputted as brand data together with operation schedule data (described hereinafter) to the control computer 20 through the brand controlling computer 29 with reference to the formulations 34 in which various kinds of data about the brand of products to be manufactured are written, as shown in FIG. 1(A) and FIG. 1(B). The inputted instrument parameters are integrally controlled in the brand controlling computer 29, and down-loaded as brand data from the brand controlling computer 29 to the control computer 20 when they are selected with respect to a desired brand at the start of operation.

Figure 7:
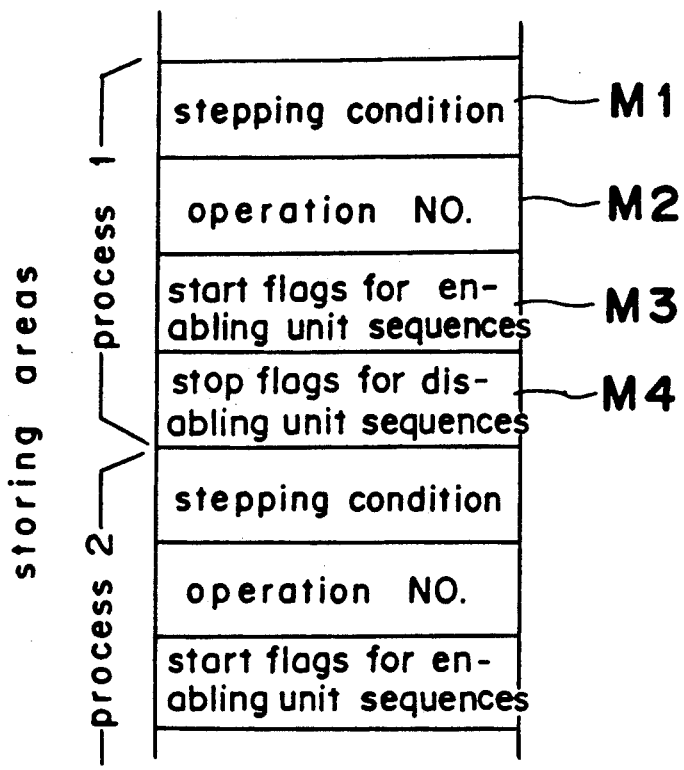
FIG. 7 is a schematic diagram showing a memory map for storing various control data and flags used in the control method.
Figure 8:
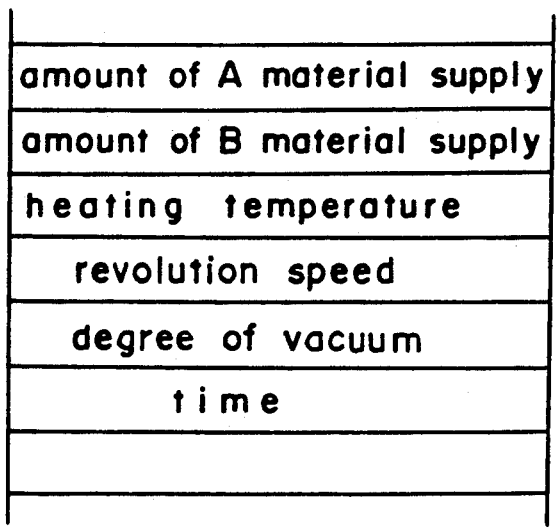
FIG. 8 is a schematic diagram showing a memory map for storing various parameters used in the unit sequence program.

Next, a description is provided of the operation schedule data. The operation schedule data is a data file for controlling what unit sequence program is to be selected, and in what order it is to be started or stopped. One example is shown in FIG. 6, where the information about how the stage numbers, the operation numbers, the unit names, the respective unit sequence which is started and/or stopped in every process, are written in a table form in the schedule data buffer 33Y consisting of a random access memory or RAM by down-loading them from the brand controlling computer 29. In the table shown in FIG. 5 ● is the start flag, X is the stop flag, and O is the complete flag which respectively represent the stepping conditions. The respective flags and the respective step numbers are written in the memory areas M1, M2, M3, M4 . . . as shown in FIG. 7.

For example, referring to FIG. 5, the process of stage No. 1 is started and the unit sequence program of the unit A (referred to as a unit sequence A hereinafter, same as other units B, C, D . . . H) is enabled by turning the start flag F1 ON, and thereafter, the predetermined process is completed with respect to the unit operated under the unit sequence A, and hence, the stop flag F2 is turned ON. Next, the process goes to stage No. 2, at which the unit sequences B, C, and E read the start flags F3, F4, and F5 to start themselves. When the respective predetermined processes of units B and C are completed, the process goes to Step No. 3, at which the unit sequence D is started.

The operation scheduler 31 in the control computer 20 constantly monitors the stepping conditions, and sets ON the start flag of the unit sequence which starts at the relevant stage if the stepping conditions are satisfied, and turns ON the stop flag of the unit sequence which stops at the relevant step. The stepping conditions can be set by all signals generated in the control computer 20, and the algorithm of signals can be optionally set by a combination of AND operation and OR operation. In addition, the operation scheduler controls the stage numbers, and the operation numbers at each production step, and uses them for monitoring and displaying the operations.

The operation scheduler is a general-purpose program which is provided to each tank in a batch plant, but also can be used for a continuous plant.

There are two operation modes of an automatic operation mode and stage-by-stage mode in the operation scheduler. When the automatic operation mode is enabled, the production stage proceeds to next stage only according to the stepping conditions, on the other hand, when the stage-by-stage mode is enabled, the production stage can not proceed to the next one until a stepping flag is set to ON, even if the stepping condition of the stage is established. For this reason, the operation scheduler is particularly provided with a stage-by-stage operation flag and the stepping flag.

With the above mentioned constitution, as shown in FIG. 1(A) and 1(B), there are provided in the unit sequence area 30 in the control computer 20, a supply unit sequence program 30-1, a heating unit sequence program 30-2, a cooling unit sequence program 30-3, and a transport unit sequence program 30-4. Each of the unit sequence programs is prepared corresponding to the flowchart as shown in FIG. 4.

Now, a description will be provided of the sequence controlling for manufacturing A brand products by employing, for example, the supply unit and the heating unit.

First, with respect to the supply unit, the supply amount of material $X_A$ for producing the A brand products is inputted to the control computer 20 through the brand controlling computer 29. The supply amount inputted is written in an area for the supply unit of the data buffer 33X in the RAM 33, when the relevant brand name is inputted through the operator's console 26 at the start of operation.

With respect to the heating unit, the heating temperature '85° C.' is inputted to the control computer 20 through the brand controlling computer 29 as well. The inputted heating temperature is written in an area corresponding to the area 'heating unit' in the data buffer 33X in the RAM 33.

Other essential conditions such as the number of sensor, the number of the valve to be opened or closed, the number of pump or motor to be started or stopped are written to the data buffer 33X.

In the meantime, the essential parameters necessary for the manufacturing of A brand products as shown in FIG. 7, such as the stepping conditions, the step numbers, the production step numbers, the number of start or stop flags, are inputted to the operation scheduler 31 in the control computer 20 through the brand controlling computer 29. The data inputted is written to the data buffer 33Y in the RAM with respect to each production step number in accordance with the brand name inputted from the operator's console 26 at the start of operation, as shown in FIG. 7.

In actual operation, each unit sequence reads the relevant area of the data buffer 33X at step S8, S9, S12, and S13 shown in FIG. 4. For example, in the case of the heating unit, the control computer 20 performs the sequence controlling with taking the data into the program shown in FIG. 3.

As shown in FIG. 6, after the data setting as described above, the controlling system is started, and the operation scheduler 31 first selects the supply unit sequence 30-1 designated as Step No. 1. When the production step proceeds to Step No. 3, the operation scheduler 31 starts the heating unit sequence, and makes it execute the program of step S1 to step S14 as shown in FIG. 3, and resets the flag at step S14. The operation scheduler 31 then selects the timer unit sequence 7 and starts the same.

In addition, by setting the start flags with respect to plural unit sequences at the same time, they can be simultaneously operated in parallel.

Furthermore, the operator can select and start a desired unit sequence without employing the operation scheduler by monitoring the operation states of the respective units.

To sum up the sequence controlling system of the present invention, the operations of installation are defined as a set of minimal functional groups of the respective units, and enabled by a combination of unit sequences which are programmed respectively with respect to each minimal functional group. The parallel processing of the unit sequences enables operation for manufacturing each brand products, and the operating conditions, which depend on the brand to be manufactured, can be controlled as instrument parameters for each unit sequence. Start flag (automatic or manual one), stop flag, interrupt flag, execution flag, and complete flag are set for each unit sequence, and they are used for exchanging between the operation scheduler and the push button sequence, and the interlocking between each of the units, and the display of the production step.

For each unit sequence program, a single push button sequence is programmed, so that each of the unit sequence program can be started or stopped individually.

The operation scheduler turns ON the start flag or stop flag of the unit sequence which starts or stops at each production step, and the flag is reset by the unit sequence.

The parameters of operation scheduler have their own names as the operation schedule data, with respect to the stepping conditions for the next step, the information on the unit sequences which are started or stopped at each production step, and the respective operation numbers.

The operation scheduler controls the operation number at each production stage, and there is displayed the production stage with reference to the master as shown in FIG. 9 for identifying the number and the name of the process which is now being processed.

The operation mode of operation scheduler includes the automatic operation mode and the stage-by-stage mode. By employing the push-button sequence, and turning ON the stage-by-stage operation flag particularly provided to the operation scheduler, the mode is switched to the stage-by-stage mode, and does not proceed to the next step even if the stepping conditions for the next step are established.

In addition, by turning ON the stepping flag particularly provided to the operation scheduler during the stage-by-stage mode, the program proceeds to the next step if the stepping conditions for the next step are not established. By turning OFF the stage-by-stage operation flag during stage-by-stage mode, the stage-by-stage mode is switched to the automatic operation mode.

The brand data includes the operation schedule data and the instrument parameter.

Figure 10:
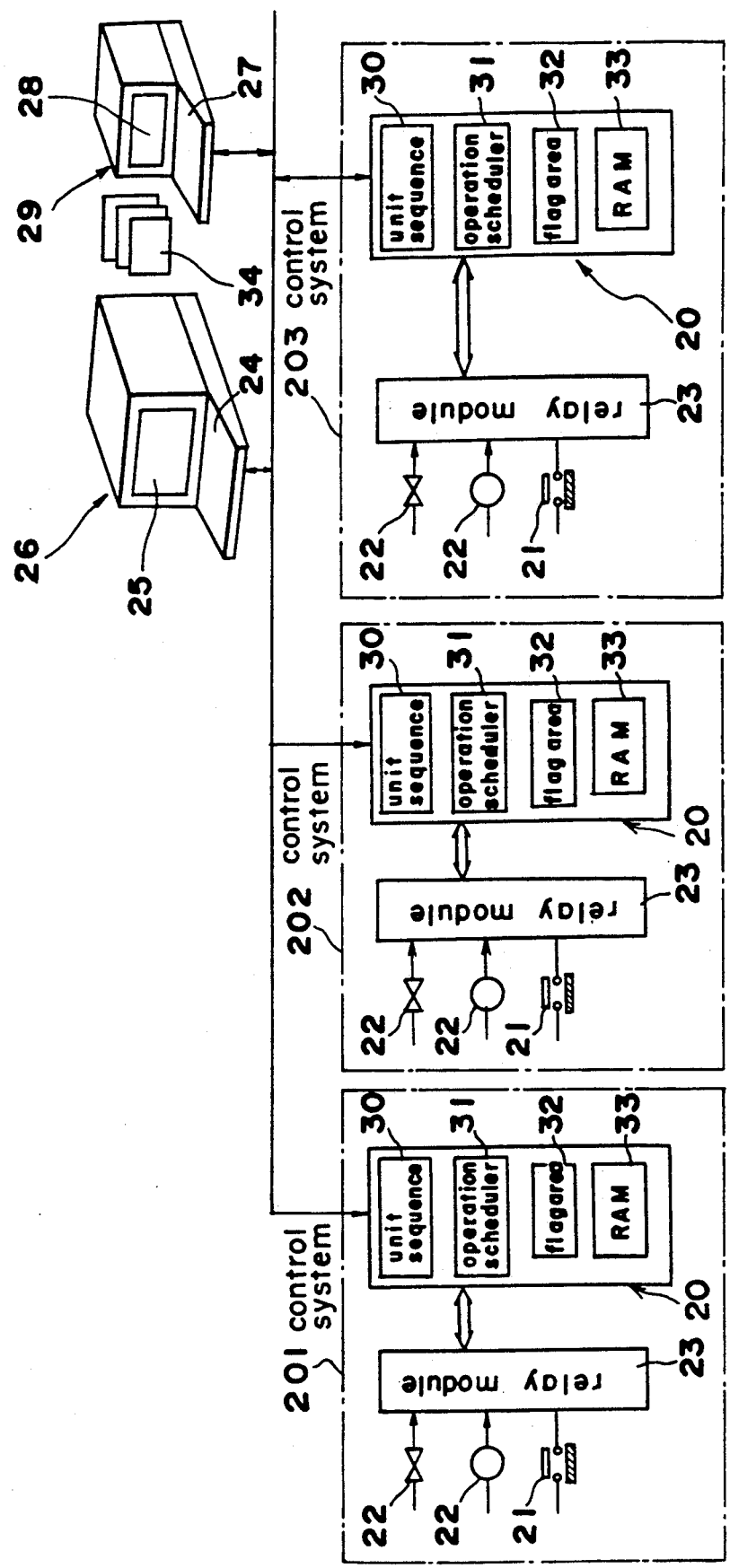
FIG. 10 is a block diagram of another example of a control device used in a control method according to the present invention.

Another embodiment of the sequence control method according to the present invention is shown in FIG. 10. In the embodiment shown in FIG. 10 there are provided three control systems 201, 202 and 203 controlled by the brand controlling computer 29. The control systems 201 to 203 are provided for controlling the processing system including tanks 101 to 103 respectively. Each of the tanks 101 to 103 is provided with the units 1 to 6 shown in FIG. 2.

Figure 12A:
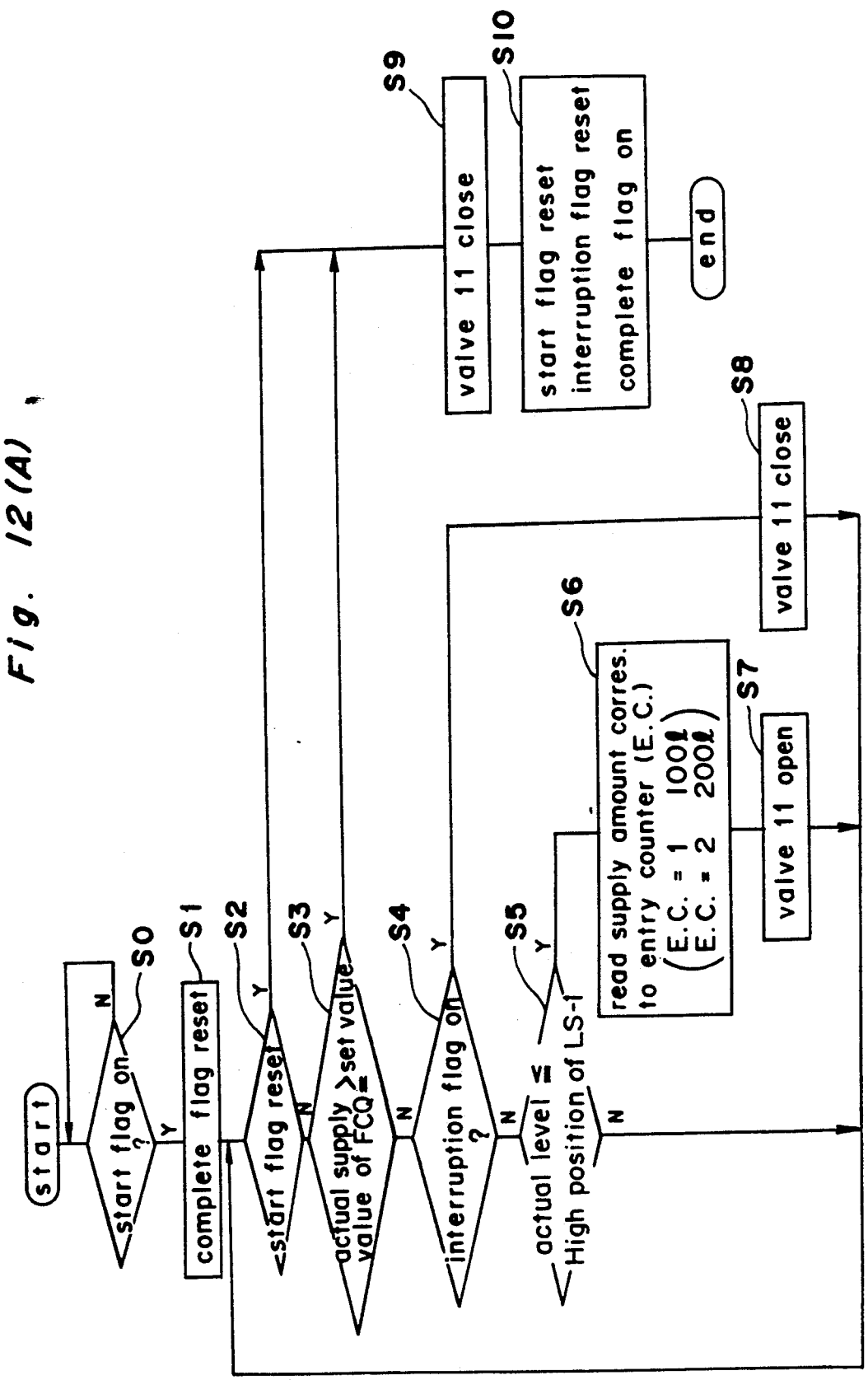
FIGS. 12(A) and 12(B) are flowcharts showing another example of unit sequence programs of a supplying unit and a heating unit.
Figure 12B:
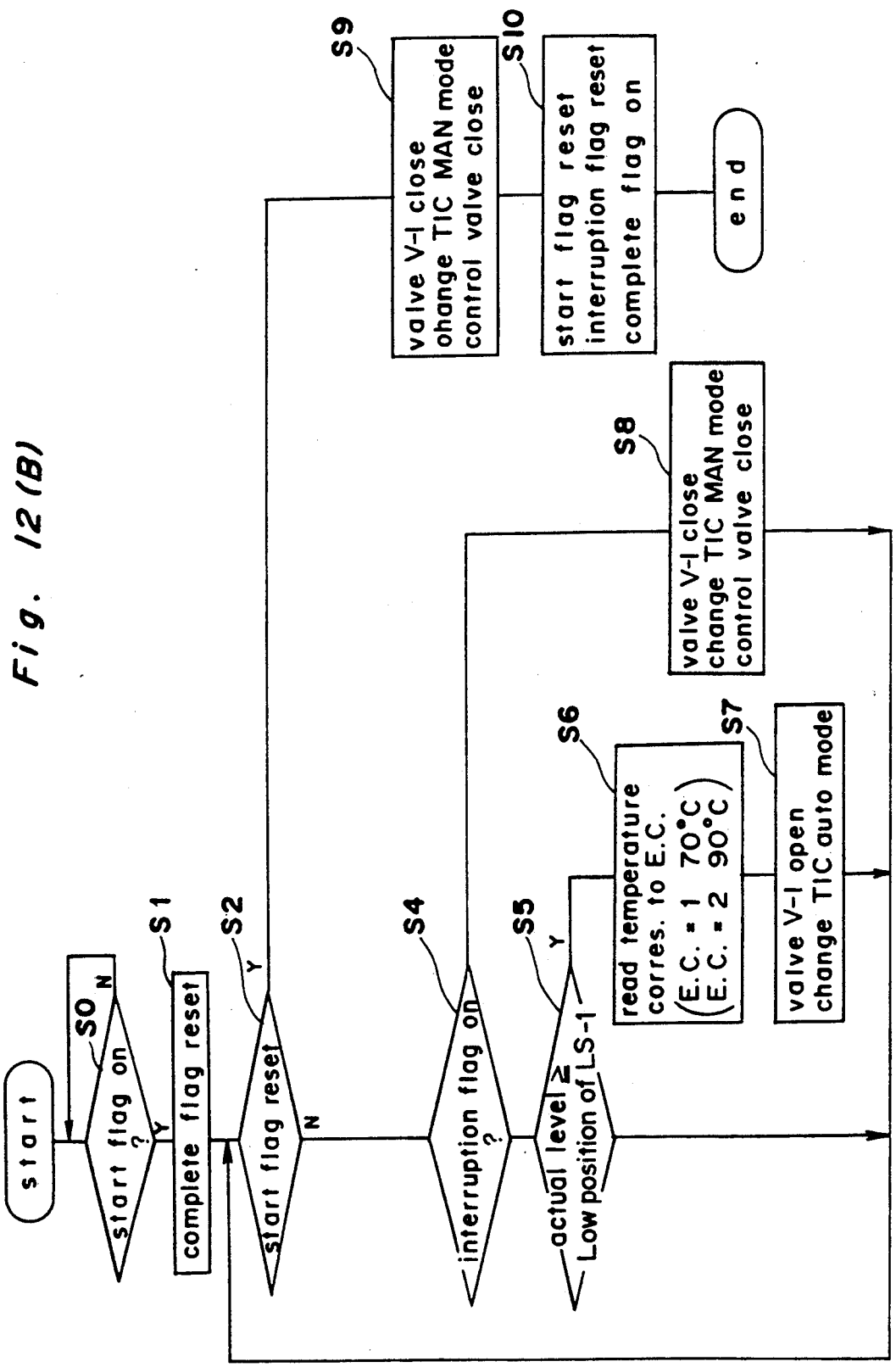
Figure 13:
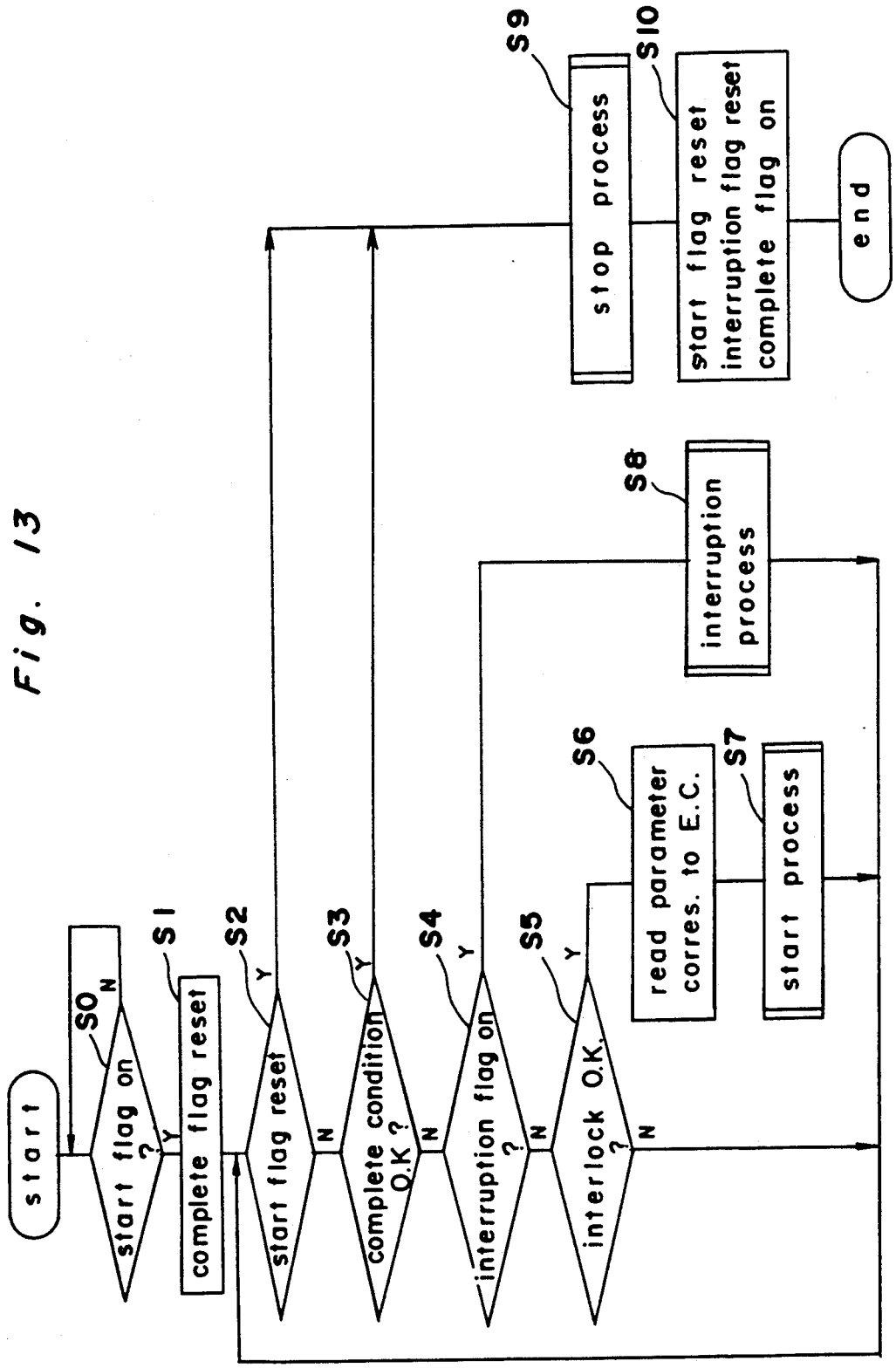
FIG. 13 is a flowchart showing an example of a unit sequence program.

In the embodiment shown in FIG. 10, the unit sequence program is arranged as shown in FIGS. 12(A) and 12(B) for the supply unit and heating unit. FIG. 13 shows a general expression of the unit sequence program.

Referring to FIG. 12(A), it is judged in the step S0 whether or not the start flag is on. In the step S1 the complete flag is reset; it is determined in the step S2 whether or not the start flag is reset. If the start flag is reset, the program goes to the step S9, while if the start flag is set, it is detected in the step S3 whether the actual amount of the material supplied to the tank (for example 101) is more than or equal to a set amount and with a yes determination, the program goes to the step S9 to close the valve 11 (see FIG. 2). If the determination in the step S3 is no, the program goes to the step S4 to determine whether or not the interruption flag is on. If the interruption flag is on, the program goes to the step S8 in which valve 11 is closed. If the interruption flags is off, the program goes to the step S5 in which it is determined whether or not the level of the solution in the tank 101 is lower than the high position of the limit switch LS-1. In case the level of the solution is higher than the high position of the limit switch LS-1, the program goes to the step S2, while the level of the solution is lower than the high position of the limit switch LS-1, the program goes to the step S6 to read the number of an entry counter and further read the amount of the parameter indicated by the number of the entry counter from the data buffer 33X of the control computer 20 as the amount of the material supplied to the tank 101. Thereafter the valve 11 is opened in the step S7.

In case the program goes to the step S9, the value 11 is closed and the program goes to the step S10 in which the start flag, the interruption flag are reset and the complete flag is set to on.

Figure 11:
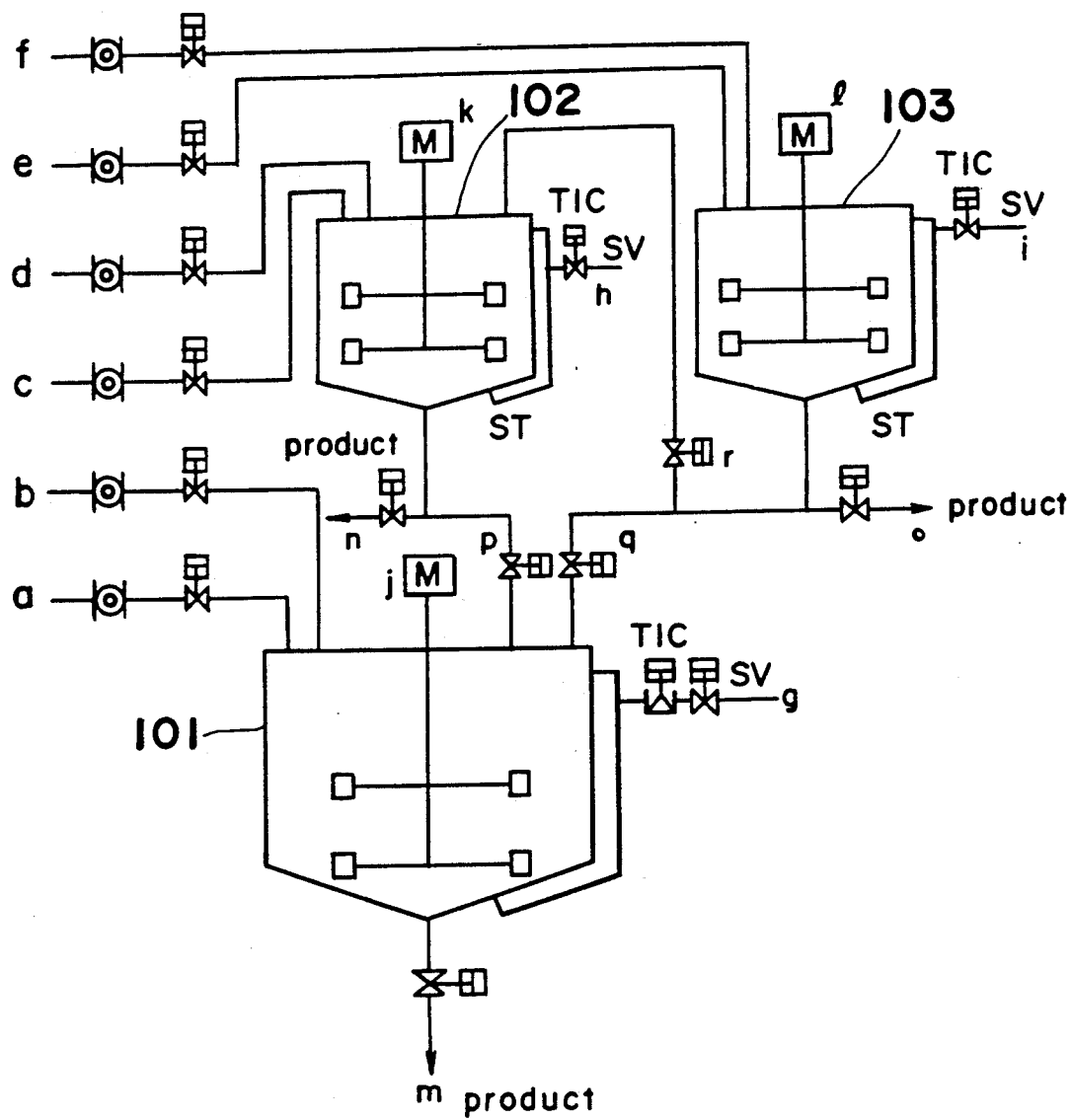
FIG. 11 is a schematic diagram showing the connecting relationship of three tanks to which the control method according to the present invention is applied.

The operation of the second embodiment is explained hereinafter. Sequence control for producing a plurality of kinds of brand of productions using a plurality of tanks with their own control computers:

In the example shown in FIG. 11, raw material a is fed into the tank 101 through a port a, raw material b is fed into the tank 101 through a port b, raw material c is fed into the tank 102 through a port c, raw material d is fed into the tank 102 through a port d, raw material e is fed into the tank 103 through a port e and
raw material f is fed into the tank 103 through a port f. In addition, steam is supplied through ports g, h and i so as to heat the tanks 101, 102 and 103 respectively. Elements j, k and 1 are agitators for the respective tanks 101, 102 and 103.

A product produced in the tank 101 is taken out from a port m, and a product in the tank 102 is taken out from a port n. A product in the tank 103 is taken out from a port o. A processed composition in the tank 102 is transferred to the tank 101 through the port P.

A processed composition in the tank 103 is transferred to the tank 101 through the port q.

The processed composition in the tank 103 is transferred to the tank 102 through the port r.

The necessary unit sequence programs for each of the products to be produced and required parameters are registered in the brand controlling computer 29. In addition, with respect to the respective brands of products, information of completion of each unit sequence and other process conditions such as the process temperature values and pressure values are registered using logic units such as an AND element(s) and OR element(s) as the stepping condition in the brand controlling computer 29.

The brand names of products, LOT numbers, and the amounts of the respective products to be processed hereafter are down-loaded from the brand controlling computer 29 in the order to be progressed. It may be possible to select, when a production process of one kind of product is completed, whether to start the next production process automatically or to start the next production process by manually operating the start button confirming various conditions. Operation of the process:

It is possible to start, interrupt and stop each of the respective tanks by manual operations. It is also possible to start and stop of each of the respective unit sequence programs. Monitoring of the process driving:

Various information such as the names of the brand of product, LOT number, process number, the state of working or stopping of the respective unit sequence programs and completion of the unit sequence programs can be displayed on the CRT 28 of the brand controlling computer 29.

The content of the production control in each production process in this case is almost similar to that performed in the control of producing one kind of product in one tank as mentioned in the first embodiment. However, the respective parameters such as the temperature and pressure are settable using a technique of an entry counter.

Figure 14:
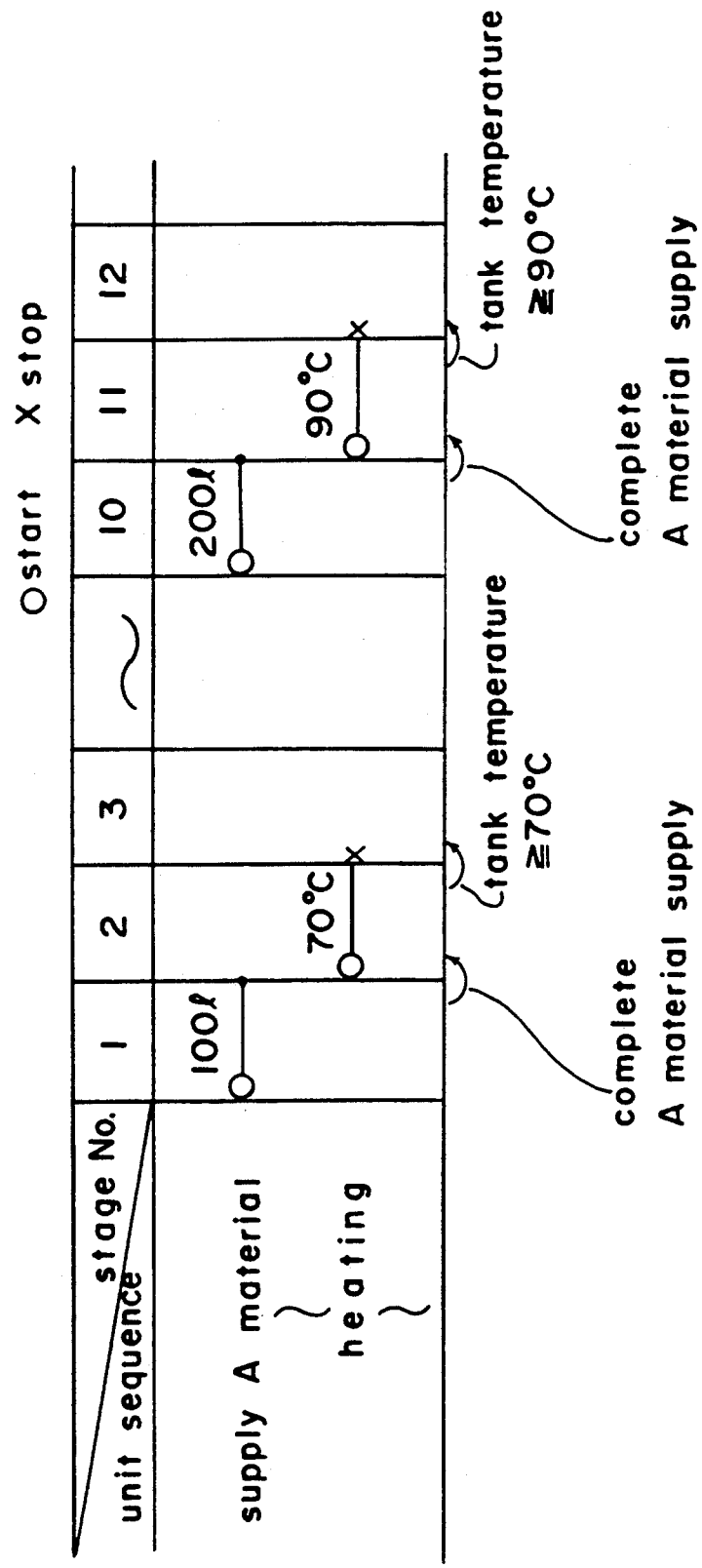
FIG. 14 is a schematic diagram showing another example of an operation scheduler.

Namely, referring to FIG. 14, assuming that the following parameters are taken:
100 liters of A material are fed in a first process;
200 liters of A material are fed in a tenth process.
The content in the tank is heated up to 70° C. in a second process.
The content in the tank is heated up to 90° C. in a eleventh process.

In this example, various data as listed in the Table 2 are registered in the memory area 33Y from the brand controlling computer 29 and the parameters listed in the Table 3 are registered in the memory area 33X from the brand controlling computer 29.

TABLE 2

| Stage NO. | CONTENTS (parameters in the memory area 33Y). |
|---|---|
| 1 | the supply unit number through which A material is supplied start entry counter : first time completion of supply A material |
| 2 | the heating unit number start entry counter : first time temperature in the tank : >70° C. |
| 3 | the heating unit number stop entry counter : first time |
| 10 | the supply unit number through which A material is supplied start entry counter : second time completion of supply A material |
| 11 | the heating unit number start entry counter : second time temperature in the tank : >90° C. |
| 12 | the heating unit number stop entry counter : second time |

TABLE 3

| Instrument parameters in the memory area 33X. | | |
|---|---|---|
| supply A material | 1 | 100 l |
| supply A material | 2 | 200 l |
| heat-up | 1 | 70° C. |
| heat-up | 2 | 90° C. |

As shown in the Tables 2 and 3, the entry counter number represents that there are written the number of times of using each unit (the supply unit of A material and heating unit in the present example) in the memory area of the RAM 33. And the entry counter number and the various parameters such as the amount of supplying material and temperature are also written in the parameter area.

In the present example, the entry counter number (first time) of the supply unit for the first stage and the entry counter number (first time) of the heating unit for the second stage are written in the executing area of RAM 33, also there are written the entry counter number (second time) of the supply unit in the tenth stage and the entry counter number (second time) of the heating unit in the eleventh stage. On the other hand, as the parameter of the supplying material, there are written 100 l for the first time and 200 l for the second time. As the heat-up parameter, 70° C. is written for the first time and 90° C. for the second time.

When the production system in which various data are set as mentioned above is started by any instruction by an operation of a start switch, the entry counter number '1' is written in the step S6 of the supply unit and the supplying amount 100 l is also written in the step S6 by reading the data '100 l' from the RAM 33 and a sequence control of supplying 100 l material in the tank is performed according to the sequence control shown in FIG. 12(A).

On the other hand, a temperature 70° C. in the step S6 of the heating unit sequence program is written also the entry counter number '1' is written and a control of heating up the content of the tank is performed.

When the material of 100 l is fed into the tank, and the control of stage No. 1 is completed, and then the process is proceeds to stage 10, the entry counter number '2' and the supply amount 200 l are read at the step S6 of the supply unit sequence program. In a similar manner, when the temperature of the content in the tank reaches to 70° C. by heating, and then the process is proceeds to stage 11, the entry counter number '2' and its temperature 90° C. are read at the step S6 of the heating unit sequence program. In the stage NO. 10, the supply unit sequence program is enabled to supply the material of 200 l and the heating unit is enabled in the stage NO. 11 to heat the content in the tank up to 90° C.

By setting various data as mentioned above, it is possible to control the tanks 101, 102 and 103 simultaneously by setting the various data in the respective control systems 201, 202 and 203.

Figure 15:
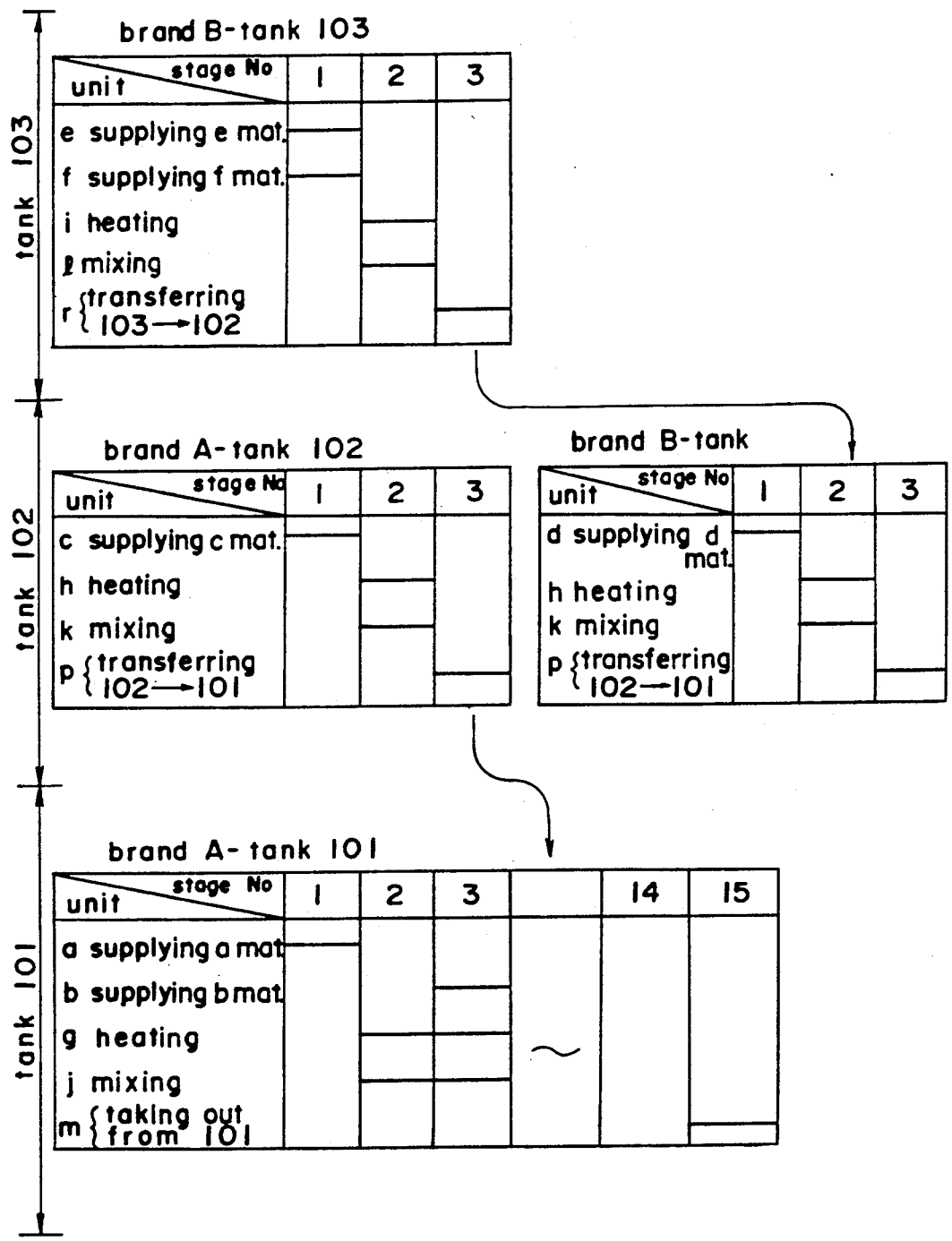
FIG. 15 is a schematic diagram showing a further example of an operation scheduler.

By using the unit sequence program, schedule controller and the entry counter number of the present invention, it is easily made to perform such control that, as shown in FIG. 15, the materials a and b are heated and mixed in the tank 101 while the material c is heated and mixed in the tank 102 and the mixed material is transferred to the tank 101 in which a product A is produced, in addition, the materials e and f are fed into the tank 103 then heated and mixed, while after the material c is processed, the material d is heated and mixed in the tank 102, subsequently in that tank 102, the material d is mixed with the intermediate material taken out from the tank 103.

An advantage of using the entry counter number is in that assuming that the entry counter number is '1' in the first stage and '2' is the seventh stage, and the production system is once interrupted in any stage between 2 to 6, then the production system starts again from the seventh stage, a correct production process can start from the seventh stage by reading the data '2' of the entry counter so that the necessary parameter corresponding to the data '2' of the entry counter can be used in the program of the seventh stage. Sequence control for producing three kinds of productions using three tanks with one control system 201:

According to the control method of the second embodiment of the present invention, it is possible to perform the sequence control for producing three kinds of brand of productions with the brand controlling computer 29 and one control computer 20 using three tanks.

Referring to FIG. 16, the tanks 102 and 103 are connected to the tank 101 and the tank 102 is connected to the tank 103 respectively through valves (not shown in FIG. 16).

The respective tanks 101, 102 and 103 are the same as shown in FIG. 2.

In the brand controlling computer 29, the brands of productions A, B and C are registered in the described order.

Figure 19:
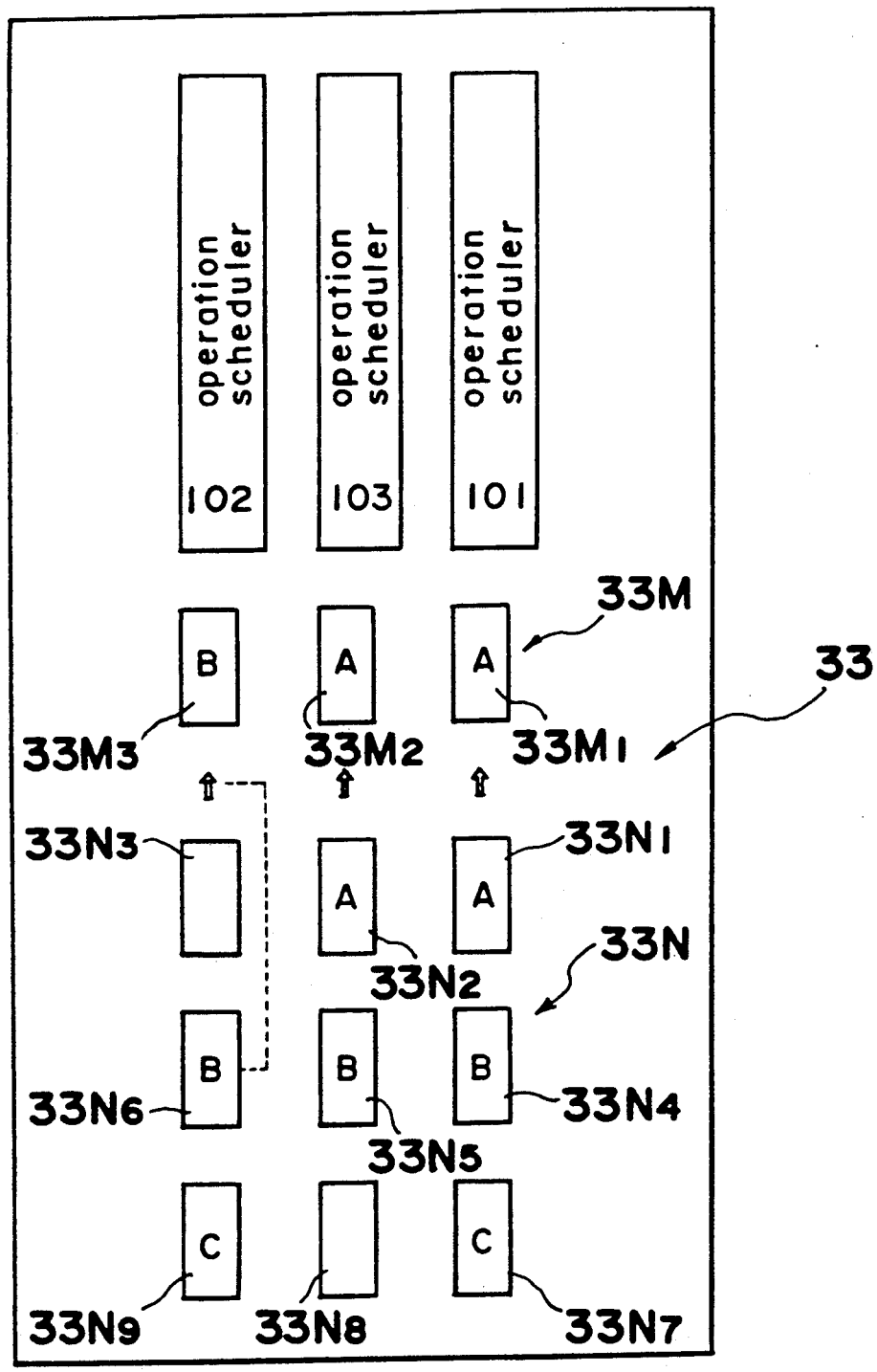
FIG. 19 is a schematic diagram showing the memory condition in the RAM.

FIG. 19 shows a way of storing the data in the RAM 33 of the control computer 20 for executing the sequence control mentioned above. Various data to be stored in the control computer 20 is represented in FIG. 18. As shown in FIG. 18, there are stored in a storing area 33Nx (X=1,2,3 ... 9) of the data buffer 33N of RAM 33 the number of the brand, the number of the final stage, start and stop of the unit, entry counter number of the respective units 1 to 6 and parameters to be taken in the unit sequence program. These data for producing the brands A, B and C are stored in the areas $33N_1$ to $33N_9$ of the data buffer 33N separated by the tanks 101, 102 and 103 as shown in FIG. 19. It is noted that in FIG. 19, the various data as shown in FIG. 18 is represented by the brands A, B and C to be produced. The data stored in the area 33Nx are adapted to be shifted to the execution areas 33M, as the process timings progress whereby the operation scheduler starts and stops each of the unit sequence programs on the basis of the data in the areas 33M.

Figure 20:
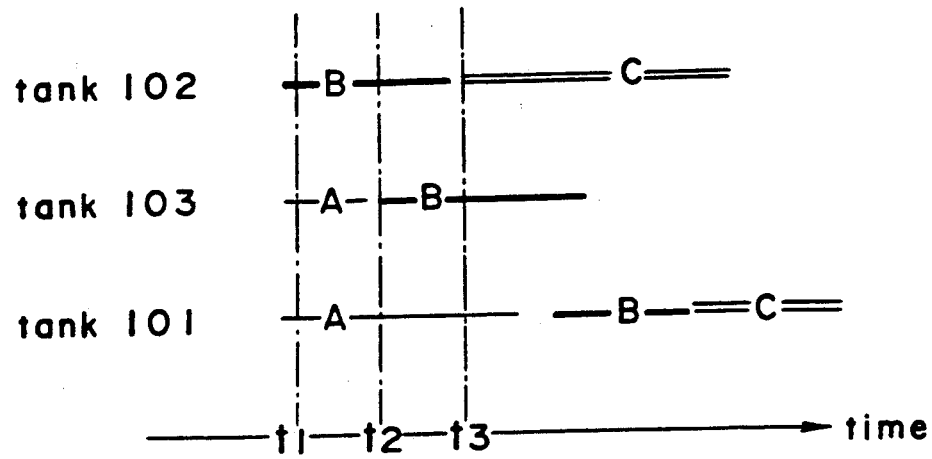
FIG. 20 is a schematic diagram showing a time schedule for operating the tanks shown in FIG. 16.
Figure 21:
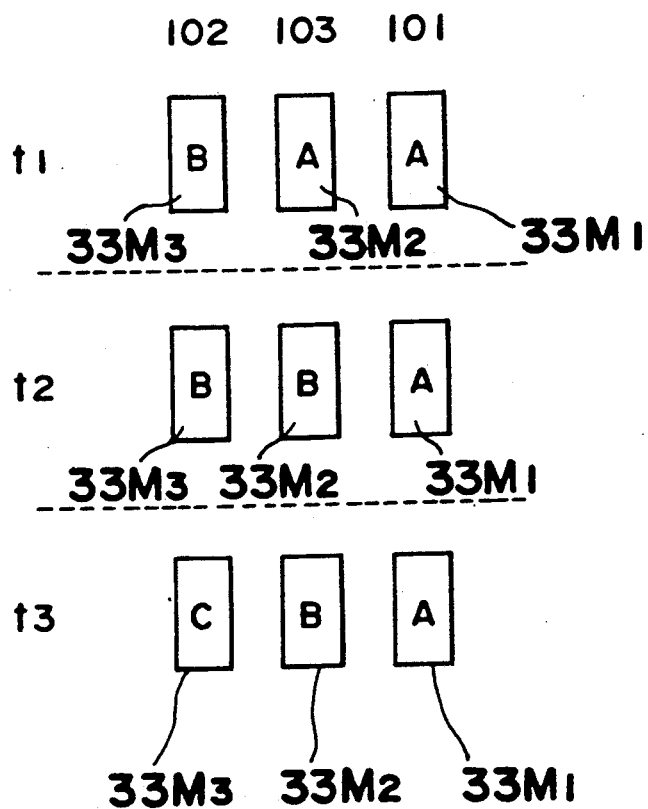
FIG. 21 is a memory map showing a change of the data in the memory corresponding to the time shown in FIG. 20.

FIG. 20 shows an operating schedule of each of tanks 101 to 103 which process respective materials for the brands A, B and C at the respective timings t1, t2 and t3. FIG. 21 shows states of data of the brands A, B and C stored in the execution areas 33M at the respective timings t1, t2 and t3.

Various parameters such as temperature and pressure and so on are set in the same manner as mentioned already. When a start switch is operated after various data are set as mentioned above, the production system starts. At the timing t1, according to the data of the brand stored in the execution area 33M, processes for the brand A are performed in the tanks 101 and 103 and a process for the brand B is performed in the tank 102. At the timing t2, the data for the brand B is written in the execution area 33M2 of the tank 103. As to the tanks 101 and 102, the same processes based on the data used at the timing t1 are continued. At the timing t3, the data for the brand C is written in the execution area 33M3 of the tank 102. As to the tanks 101 and 103, the same processes based on the data used at the timing t2 are continued.

The above operation may be summarized as follows:

At the timing t1, the data stored in the execution area 33M of the RAM 33 are read out. For example, the tank 102 is assigned for producing the product B and the control information containing parameters for the production of the product B and instructions of start, stop and entry counter number is read to the area 33M from the area 33N and is executed. The same operation is effected for the tanks 101 and 103.

At the timing t2, the intermediate product of the brand A processed in the tank 103 is transferred to the tank 101. The tank 103 is assigned for producing the brand B and the data containing parameters for the process of the brand B and the instructions of start, stop and entry counter number is read to the area 33M2 from the area 33N5 and is executed. As to the tank 101, the process for the brand A is continued. As to the tank 102, the process for the product B is continued.

At the timing t3, the intermediate product of the brand B processed in the tank 102 is transferred to the tank 103. The tank 102 is assigned for producing the brand C and the data containing the parameters for the process of the brand C and the instructions of start, stop and entry counter number is read to the area 33M3 from the area 33N9 and is executed. As to the tank 101, the process for the brand A is continued. As to the tank 103, the process for the brand B is continued.

In case there is a continuous operating instruction in the brand controlling computer 29, if it is detected that the tank is empty, another intermediate product is processed in that tank. For example, the brand B is processed, when the process in the tank 102 is completed, the control computer 20 checks whether or not the tank 103 is empty and stopped, then if it is found that the tank 103 is empty, the content of the tank 102 of the brand B is automatically transferred to the tank 103.

The emptiness of the tank is detected in such a manner that as shown in FIG. 18, the final process number of a tank such as the tank 101 is transferred to the RAM 33 of the control computer 20. The operation scheduler which is controlling the tank 101 judges that, when the number of the process now being executed becomes equal to the final process number and the progressing condition is established, the tank is empty. The result of the judgement is stored in the execution area of the RAM 33 corresponding to the tank 101 for example. When the operation scheduler controlling the tank 102 reads the empty of the tank 101, shifting the information necessary for the next production in the execution area so as to execute the process of producing the next product.

(1) An advantage of the present invention is in that the sequence control programs can be easily arranged by using the unit sequence program as shown in FIGS. 3, 4, 12A, 12B and 13 even if the control computer or computers control a plurality of production plants (tanks 101, 102 and 103 in the embodiment).

By using the technique of the entry counter, it is easy to set the parameters such as temperature and pressure in the unit sequence, even if the process is skipped.

In addition, since the present invention uses the unit sequence programs, each of which is provided for the minimum function unit of the production plant such as supply unit, heating unit and mixing unit and so on, the sequence control program of a plant for producing any product or brand can be easily arranged by merely combining the necessary unit sequence program.

In addition, by setting the start flags with respect to plural unit sequences at the same time, they can be simultaneously operated in parallel.

In addition, once a sequence control program for one kind of product is completed, the sequence control program can be used for producing one or more similar kinds of products by only changing the parameters in the unit sequence program.

(2) Therefore, it is possible to change the manufacturing process and/or addition of the variety of the product by any person who is not experience in drafting the conventional sequence control program.

(3) A further advantage of the sequence control method according to the present invention is in that even if there is any change in the equipment of the manufacturing system, it is sufficient to change the unit sequence program relating to the changed equipment.

(4) A still further advantage of the sequence control method according to the present invention is in that it is easy to temporarily perform an experimental manufacturing process because of easiness of design of the sequence control program, this enables to decrease the necessary cycle time of manufacturing and to improve the quality of the products.

(5) A still further advantage of the sequence control method according to the present invention is in that it is easy to design the sequence control method of a multi-product production system without the design depending on the products.

(6) A still further advantage of the sequence control method according to the present invention is in that since the basic technical idea of using the unit sequence is rather simple, maintenance of the sequence program is easy.

What is claimed is:

1. A method of sequence control for controlling unit sequence programs singly or in parallel, each of the programs including a series of steps from a start process to a stop process and each of the programs being installed for every minimum function unit which is independent of brand and process of product to be produced, the method of comprising the steps of:

controlling a unit sequence program in association with at least one program selected from other unit sequence programs and other control programs;

preparing unit sequence programs for each of the minimum function units, each of said unit sequence programs availing itself of operating conditions of each production as parameters and controlling each minimum function unit with sequence control in accordance with the parameters.

2. The method of sequence control according to claim 1, wherein said unit sequence program further comprises at least one flag which is related to at least one program selected from the other unit sequence programs and other control programs, whereby the unit sequence program can progress in response to the state of the respective flags.

3. The method of sequence control according to claims 1 or 2, wherein said unit sequence program is controlled by an operation scheduler having the parameter which is a stepping condition or the information with respect to the unit sequence to start or to stop.

4. The method of sequence control according to claim 3, wherein at least one unit control device, each of which performs sequence control of at least one brand by taking necessary operating conditions for the brand as the parameters in the unit sequence program, is controlled by a central control device and the parameters are set by the central control device.

5. The method of sequence control according to claim 4, wherein one unit control device controls processes of a plurality of brands.

6. The method of sequence control according to claim 5, wherein entry counter numbers which show the order of using said unit sequence program and the operation parameters are stored in a storing means in the central control device, and the entry counter number is designated in the unit sequence program, in the case where the same unit sequence program is used a plural number of times for producing the same brand or a different brand.

7. The method of sequence control according to claim 5, wherein the central control device monitors the brands, lot numbers, stage numbers of the executing process, conditions of start, stop and complete of the unit sequence programs in a memory of a control computer.

8. The method of sequence control according to claim 7, wherein entry counter numbers which show the order of using said unit sequence program and the operation parameters are stored in a storing means in the central control device, and the entry counter number is designated in the unit sequence program, in the case where the same unit sequence program is used a plural number of times for producing the same brand or a difference brand.

9. A method of sequence control for controlling unit sequence programs singly or in parallel, each of the programs including a series of steps from a start process to a stop process and each of the programs being installed specifically for every minimum function unit of an apparatus which is independent of brand and process of a product to be produced, the method comprising the steps of:

providing unit sequence programs for each of the minimum function units to be able to operate in association with at least one program selected from other unit sequence programs and other control programs;

inputting the operating condition for each brand as parameters into each of the unit sequence programs;

controlling, by means a central control device, at least one unit control device for controlling at least one unit sequence program for at least one of the brands in accordance with the inputted parameters; and setting the operating conditions for the minimum function units through the central control device.

10. The method of sequence control according to claim 9, wherein said unit sequence program further comprises at least one flag which is related to at least one program selected from the other unit sequence programs and other control programs, whereby the unit sequence program can be progressed in response to the state of the respective flag.

11. The method of sequence control according to claim 9, wherein one unit control device controls processes of a plurality of brands.

12. The method of sequence control according to claim 11, wherein the central control device monitors the brands, lot numbers, stage numbers of the executing process, conditions of start, stop and complete of the unit sequence programs in a memory of a control computer.

13. The method of sequence control according to claim 12, wherein entry counter numbers which show the order of using said unit and sequence program the operation parameters are stored in a storing means in the central control device, and the entry counter number is designated in the unit sequence program, in the case where the same unit sequence program is used a plural number of times for producing the same brand or a different brand.

14. The method of sequence control according to claim 11, wherein entry counter numbers which show the order of using said unit sequence program and the operation parameters are stored in a storing means in the central control device, and the entry counter number is designated in the unit sequence program, in the case where the same unit sequence program is used a plural number of times for producing the same brand or a different brand.

15. The method of sequence control according to claim 9, wherein the central control device monitors the brands, lot numbers, stage numbers of the executing process, conditions of start, stop and complete of the unit sequence programs in a memory of a control computer.

16. The method of sequence control according to claim 15, wherein entry counter numbers which show order of using said unit sequence program and the operation parameters are stored in a storing means in the central control device, and the entry counter number is designated in the unit sequence program, in the case where the same unit sequence program is used a plural number of times for producing the same brand or a different brand.

17. The method of sequence control according to claim 9, wherein entry counter numbers which show the order of using said unit sequence program and the operation parameters are stored in a storing means in the central control device, and the entry counter number is designated in the unit sequence program, in the case where the same unit sequence program is used a plural number of times for producing the same brand or a different brand.

18. The method of sequence control according to claim 9, wherein said unit sequence program is controlled by an operation scheduler having the parameter which is the stepping condition or the information with respect to the unit sequence program to start or to stop.

* * * * *